Dec. 2, 1941.  V. J. SCHAEFER  2,264,892
COATING FOR ELECTRIC DEVICES
Filed Dec. 29, 1939

Inventor:
Vincent J. Schaefer,
by Harry E. Dunham
His Attorney.

Patented Dec. 2, 1941

2,264,892

UNITED STATES PATENT OFFICE 2,264,892

COATING FOR ELECTRIC DEVICES

Vincent J. Schaefer, Schenectady, N. Y., assignor to General Electric Company, a corporation of New York Application December 29, 1939, Serial No. 311,545

13 Claims. (Cl. 250—81)

The present invention deals with improved films comprising as an essential and predominant ingredient inherently non-adhesive materials, as, for example, films of conductive material, such as graphite, or fluorescent inorganic materials in electric discharge devices or in electric lamps. Such devices ordinarily consist of glass to which powdered inorganic substances do not readily adhere.

In order to apply non-adhesive materials on a base of glass or similar smooth surfaces, adhesive bonding agents containing a liquid medium have been employed. Upon evaporation of a liquid medium, a residue remains whereby the non-adhesive material becomes bonded to the base. The characteristics of such bonding agents have presented special problems in the manufacture of electric devices. In highly evacuated electric devices, such as cathode ray tubes, disturbances or failure may result due to gas evolution from a residue left by a bonding agent for the films.

Organic bonding materials especially are subject to gas evolution, even when subjected prior to the sealing of the device, to thermal treatment intended to decompose or burn out the organic residue. Previously used suspending and bonding agents also have resulted in other disadvantages, such for example as unevenness in the resulting coating. The unevenness apparently can be ascribed to high viscosity of the liquid suspension and inequality of evaporation of liquid components.

It is the object of my present invention to provide adhesive compositions for the production of films of various kinds which are free from such disadvantages, and in which the bonding agent consists of an inert, stable, and gas-free inorganic material.

My invention is applicable to the bonding or attachment to lamps of films comprising fluorescent materials or phosphors. It is also applicable to the bonding of other finely divided materials, as, for example, graphite or finely divided metal upon a supporting base, such as a glass surface.

The distinctive new ingredient whereby such finely divided materials are suspended in a liquid menstruum and upon evaporation of the liquid are bonded to the solid surface consists of a purified colloidal suspension of the natural mineral known as bentonite. When suspended in water, the colloidal bentonite readily forms a gel having a viscosity sufficiently high to keep the powdered materials mixed therewith in suspension. Its other advantages will be presently explained.

Figure 1:
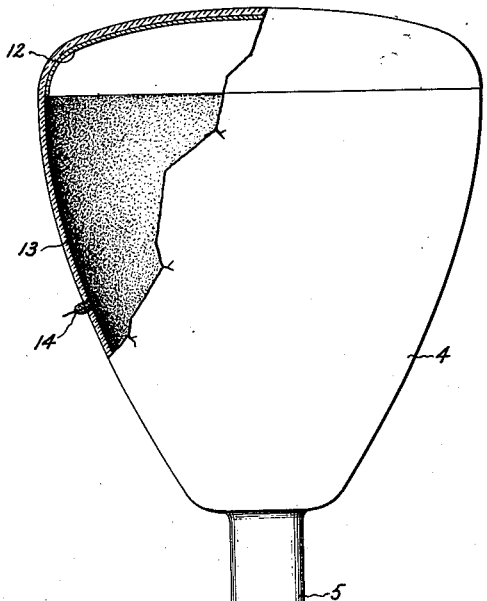
Figure 3:
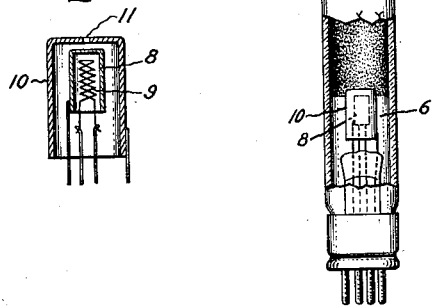
Figure 2:
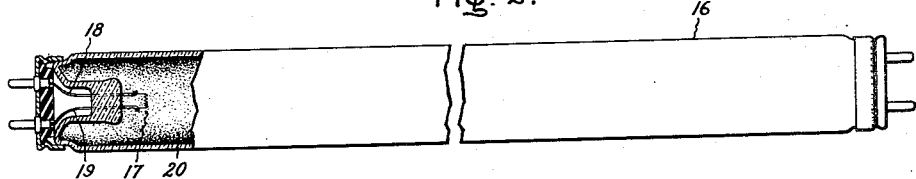

The accompanying drawing illustrates two embodiments of my invention. Fig. 1 illustrates somewhat conventionally a cathode ray tube, such as used in television apparatus, which is provided with a conducting layer containing bentonite. Fig. 2 illustrates an electric lamp containing a fluorescent coating containing bentonite; and Fig. 3 is an enlarged detail view of cathode structure of the device of Fig. 1.

Bentonite is a natural hydrosilicate of alumina having the distinctive property of forming a homogeneous and viscous gel in the presence of a relatively large amount of water. It is used industrially as a "filler," as a filtration medium, and in general where a finely divided powder is desired. Chemically, bentonite may be represented by the formula $Al_2O_3 \cdot 4SiO_2 \cdot XH_2O$. The alumina may be replaced by magnesia as in white bentonite. It is no more hygroscopic than more common argillaceous material, but bentonite does have a great physical avidity for liquid water and it is this feature which gives to bentonite its principal physical perfection.

Colloidal bentonite suitable for the purposes of the present invention may be prepared by agitating about 2½ per cent of commercial white bentonite in 97½ per cent distilled water, and allowing the resulting suspension to stand for a protracted period, say for about a week, in order to permit gravity separation of coarser material which may be discarded. The supernatant liquid product which may be removed by syphoning, or any other suitable way, if desired may be further classified as to the size of particles by the action of a high speed centrifuge. Preferably, material having a particle diameter of about one-tenth micron and smaller is used.

The suspension of bentonite of such small particle size is diluted with distilled water to a desired concentration. Aqueous suspensions of bentonite having a low concentration, ordinarily less than 2 per cent solids, have been found desirable for carrying out my invention. The percentage of solids may be determined by weighing a few cubic centimeters of the aqueous bentonite suspension drying at 110° C. to constant weight, and determining the relation of the residue to the original weight of the suspension.

My invention may be embodied in conducting coatings for the interior of cathode ray tubes such as used for television purposes and as illustrated in Fig. 1. The device shown in this figure consists of a generally pear-shaped glass bulb 4 joined to a narrow tubular neck portion 5, in which is mounted a source of electrons 6. As better shown in Fig. 3, this source includes a thermionic oxide-coated cathode 8 which is provided with an internal heater 9 as diagrammatically indicated. Outside the cathode is a primary anode or grid 10 containing an orifice 11 through which the electrons or "cathode rays" emerge.

At the opposite extremity or rounded end of the tube is provided a coating 12 of fluorescent material which is shown in the drawing of somewhat enlarged thickness. Intermediate the fluorescent coating 12 and the electron source 6 there is provided on the flared portion of the tube and on an adjoining section of the neck 5 a thin coating 13 of conductive material, such, for example, as graphite. The coating 13 makes electrical contact with a sealed-in conductor 14 and functions as the second anode of the cathode ray tube.

A composition suitable for producing the conductive coating 13 may be made up of the following ingredients:

350 cc. of bentonite suspension containing about 0.5% bentonite solids.
150 grams of graphite.

This mixture is ball-milled to render it thoroughly homogeneous. It may be applied upon the glass surface, for example, by causing the liquid suspension to enter the narrow neck of the tube before the electrodes have been mounted. The liquid is caused to rise to the required height adjacent the fluorescent screen as indicated, and then is withdrawn to leave a coating. The coating also may be applied in any other convenient way as by spraying or painting the same upon the glass surface. Upon the drying of the coating there results a uniform, adherent film 13 consisting mainly of graphite bonded with a relatively minute amount of solid, gas-free bentonite. It is electrically conducting and stable under the conditions of operation of the device. After the usual bake-out and exhaust of the tube, the coating or film thus made evolves little or no gas.

The proportions here given are illustrative only. In general, I may use a composition made up of about 1000 cc. of water, having suspended therein about 0.3 to 2.5 per cent by weight of bentonite and about 100 to 500 grams of graphite. In a copending application Serial No. 321,030, filed February 27, 1940 by LeRoy E. Record, and assigned to the same assignee as this application, claims are made on a cathode ray device provided with a conducting film or coating such as above described.

The fluorescent screen 12 may be applied by any approved conventional method, but the utilization of bentonite as a bonding agent for fluorescent material is advantageous and constitutes another embodiment of my invention.

For example, an aqueous suspension of colloidal bentonite suspension in water containing about 0.9 per cent solids is flowed evenly over the flattened surface of the cathode ray tube which is to be coated with fluorescent material. The excess material is removed by suction. The resulting bentonite film is partially dried until a sticky condition results. A suitable finely divided fluorescent material such as zinc sulphide or zinc silicate is applied to the sticky film by dusting the fluorescent material over the sticky film to which it adheres. The coated film then is dried. If desired, an additional coat of bentonite may be applied over the surface of the fluorescent material to more thoroughly bond it in place.

I find that the bentonite does not adhere readily to the surface of the film 13 of graphite so that even if some excess bentonite should inadvertently coat the film of graphite, it can readily be removed by shaking or wiping when the coating of the end of the tube with fluorescent material has been completed by drying.

The structural features of the device of Fig. 1 have been only diagrammatically indicated as they do not form part of the present invention. They are more fully described in Zworykin Patent 2,109,245, patented February 22, 1938. Upon completion of the device it is evacuated by conventional methods to a pressure so low that the gas ionization effects are inappreciable during its operation.

As already stated above, my invention also may be embodied in the preparation of coatings of fluorescent substances (phosphors) upon the interior surfaces of the fluorescent lamps. Another modification of my invention will be described in connection with the fabrication of such a lamp which is shown in Fig. 2. It consists of an elongated glass tube 16, into opposite ends of which are sealed thermionic electrodes, only one of which is shown at 17, the glass wall being in part broken away. These electrodes may comprise coiled wires coated with activating oxide or the like They are arranged to be separately heated by a current conducted thereto by the sealed-in leading-in wires as indicated at 18, 19 at the broken-away part of the lamp. The cooperating electrode at the opposite end of the lamp may be similar.

In applying a fluorescent coating to the interior surface of the lamp tube 16, it is preferred to employ a fluid of sufficiently high viscosity to hold the fluorescent material in suspension for a relatively long time so that the fluorescent material will not settle out during the process of coating the tubes. It is desirable also to maintain the concentration of bentonite solids as low as possible so as not to interfere with the generation and transmission of light through the resultant coating.

To increase the viscosity of the bentonite suspension without unduly increasing the concentration of bentonite, suitable addition materials may be introduced, such for example, as chlorides of sodium or potassium, or magnesium oxide and sodium hydroxide which cause gelation. The addition of such agents is accompanied with some disadvantages as thereby the amount of solids present is somewhat increased. On the other hand, the viscosity of the suspension may be raised by the addition of ethyl alcohol, which does not increase the solids present. The alcohol evaporates readily, thus accelerating the drying of the suspension.

The following example will illustrate this modification of my invention. To one part of an aqueous bentonite suspension containing about 1.95 per cent of solids, 3 parts of ethyl alcohol are added, thereby making a more viscous suspension, which, however, contains only about 0.49 per cent solids. To this suspension there is added a suitable fluorescent material in the proportion of 0.15 part of fluorescent material to one part of aqueous alcohol bentonite suspension. The mixture is ball-milled to render it uniform. The suspension of phosphor, for example, zinc silicate, calcium tungstate and the like and the bentonite bonding agent is applied in a thin film 20 upon the interior of the glass tube before the electrode parts are mounted therein. For example, the tube may be filled with a suspension and the suspension allowed to drain. The remaining film then is dried with warm air.

Upon the mounting of the electrode parts, the lamp is baked out, exhausted of air, and charged with a suitable gaseous filling as, for example, the starting gas, such as argon, at a pressure of a few millimeters, and a small quantity of mercury. As is well known, other gaseous media may be used, as, for example, a charge of neon or helium gas.

The bentonite causes firm adherence of the fluorescent powder to the interior of the bulb and, being insignificant in amount, does not interfere to an appreciable extent with the output of light from the lamp. The quantity of bentonite in suspension may be varied in accordance with the other conditions, and in general should be restricted to the minimum amount required to cause adherence of the fluorescent powder. For example, the bentonite content may vary from 0.3 to 1.8 per cent of total solids. The weight of bentonite per gram of fluorescent material also may vary considerably, for example, from 0.3 to 5 per cent, depending upon the other conditions.

In some cases other bonding agents may be used in combination with the bentonite in suspension. For example, I have used with success an addition of polymetaphosphate. Also, the spreading or wetting property of the suspension may be improved by the addition of a wetting agent, such, for example, as a sodium salt of dioctylsulphosuccinic acid. For example, a mixture such as follows may be used:

| | Parts |
|---|---|
| Bentonite suspension (0.85% solids) | 190 |
| Fluorescent zinc silicate | 30 |
| Sodium polymetaphosphate | 1 |

These materials are thoroughly mixed in order to render the composition homogeneous. This composition flows readily and produces a hard, adherent coating.

The modifications of my invention which have been described in connection with the production of fluorescent coatings in lamps also may be utilized for the production of fluorescent screens in cathode ray tubes such as shown in Fig. 1.

What I claim as new and desire to secure by Letters Patent of the United States is:

1. A supporting base and an adherent film thereon comprising particles of a non-adhesive solid material and a bonding agent therefor consisting of bentonite, the total solids comprising less than 2 per cent of bentonite.

2. A supporting base of vitreous material and an adherent film thereon comprising the desiccated residue of an aqueous suspension of bentonite particles having a maximum diameter of one-tenth micron and finely divided non-adhesive solid fluorescent material.

3. A lamp providing a supporting base of vitreous material and an adherent film thereon comprising as substantial and essential ingredients fluorescent material and bentonite.

4. A composition consisting preponderantly of water and particles of suspended fluorescent material and a bonding agent therein consisting of colloidal bentonite, the total solids comprising less than 2 per cent of bentonite.

5. A supporting base of vitreous material and an adherent film thereon comprising as substantial and essential ingredients fluorescent material and a fractional per cent by weight of bentonite.

6. An adhesive coating composition comprising a liquid medium and a suspension therein consisting of finely divided, non-adhesive solid fluorescent particles and colloidal bentonite particles having a diameter at least as small as about one-tenth micron admixed therewith in proportion not substantially exceeding about 2 per cent of said solid by weight.

7. An electric discharge device comprising a sealed envelope, means for supporting an electric discharge therein and a coating of fluorescent material bonded with bentonite functionally co-operative with said discharge and located on an interior surface of said envelope, said coating under operating conditions of said device being substantially free from evolution of gas which would have a deleterious effect on the operation of said device.

8. An electric lamp comprising a vitreous container, electrodes mounted therein, a gaseous filling and a film of fluorescent material bonded to the surface of said container, said film consisting of finely divided phosphor and a relatively insignificant amount of bentonite.

9. The method of coating the surface of a lamp with fluorescent material which consists in selecting bentonite particles having a maximum diameter no greater than about one-tenth micron, suspending said particles in water, adding a fluorescent material to the aqueous suspension of such selected particles, flowing the resulting mixture over the surface to be coated and drying until a hard, adherent coating remains.

10. The method of coating the surface of a lamp with fluorescent material which consists in suspending selected bentonite particles having a maximum diameter of about one-tenth micron together with a viscosity-enhancing reagent to sufficient water to produce a viscous liquid medium, adding fluorescent material to said liquid medium, flowing the suspension over the surface to be coated and drying until a hard, adherent coating remains.

11. The method of coating the surface of a lamp with fluorescent material which consists in suspending selected bentonite particles having a maximum diameter of about one-tenth micron together with ethyl alcohol to sufficient water to produce a viscous liquid medium, adding fluorescent material to said liquid medium, flowing the suspension over the surface to be coated and drying until a hard, adherent coating remains.

12. A composition consisting of an aqueous suspension of selected bentonite particles having a maximum size of about one-tenth micron and also having in suspension particles of fluorescent material, the suspended solid matter including about 0.3 to 1.8 per cent of bentonite.

13. A composition consisting of a liquid component of water and ethyl alcohol, and a solid component of bentonite particles having a maximum size of about one-tenth micron, and particles of fluorescent material, the total solids comprising less than two per cent of bentonite.

VINCENT J. SCHAEFER.